Dec. 8, 1936.  J. OTTOLINI  2,063,459
COILABLE MEASURING DEVICE
Filed March 9, 1932
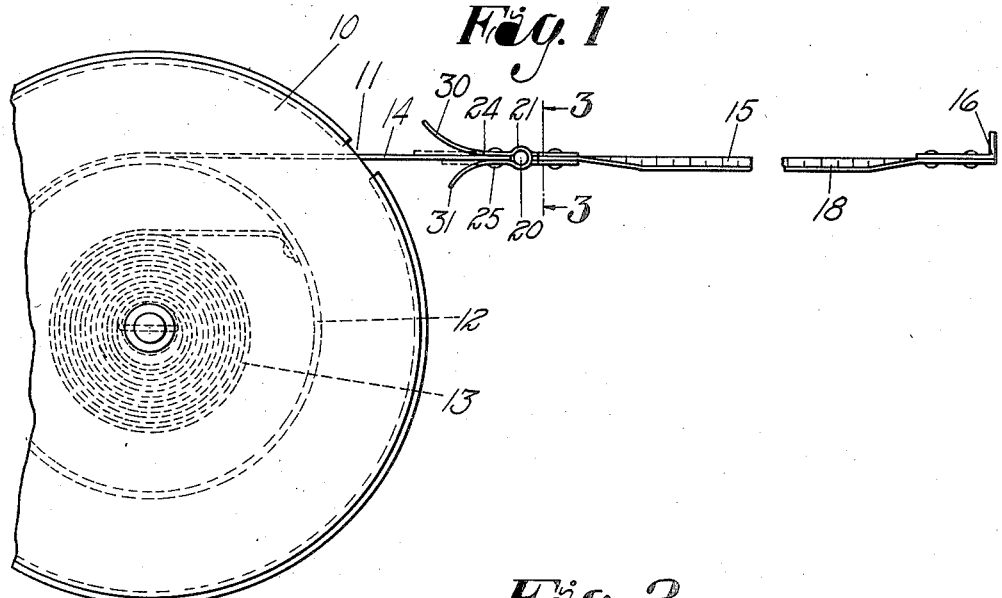
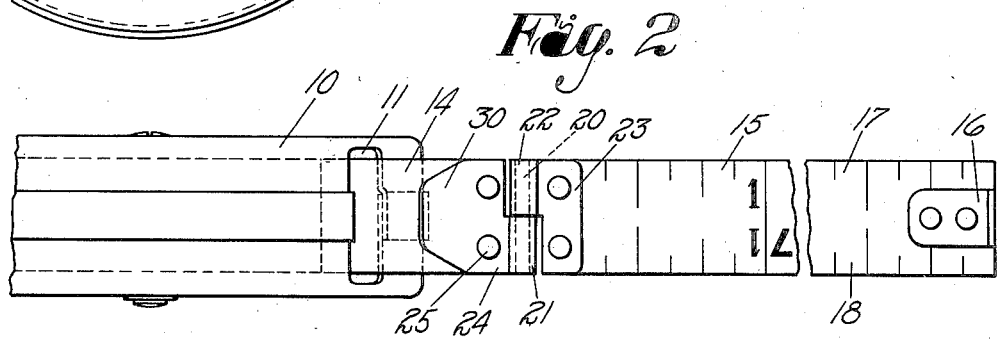
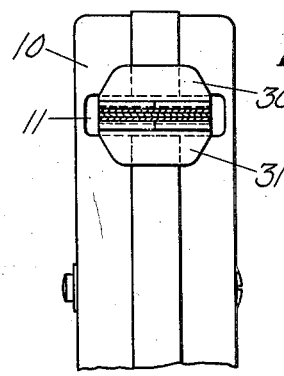
Inventor
Joseph Ottolini
By T. Clay Lindsey.
Attorney Patented Dec. 8, 1936

2,063,459

UNITED STATES PATENT OFFICE 2,063,459

COILABLE MEASURING DEVICE

Joseph Ottolini, Berlin, N. H., assignor to Hiram A. Farrand, Inc., Berlin, N. H., a corporation of New Hampshire Application March 9, 1932, Serial No. 597,667

6 Claims. (Cl. 33—138)

This invention relates to that class of measuring devices which includes steel tapes or coilable rules, and particularly those measuring devices having a steel tape or rule which is automatically wound or aided into coils by suitable resilient means, usually in the form of a coiled spring attached to the container or casing within which the steel tape or rule is wound.

It is customary in devices of this sort to permanently attach the coilable measuring strip to a winding mechanism which includes a coiled spring, commonly provided with sufficient tension to overcome the resistance which friction of the parts and the bending of the strip offers to winding so that, when the strip is drawn out, the tension of the spring is thereby increased and power is stored therein; then, when the strip is released, it is immediately and automatically rewound into a coil unless checked by some means provided for that purpose. This means may take the form of a ratchet and pawl device or a frictional brake device which serves to hold the measuring strip at any particular position to which it has been extended and which may be manually controlled to release the resilient means and permit it to wind up the measuring strip.

It has also been proposed to provide a device of this kind wherein the tension of the resilient means is only such as to approximately balance the resistance of friction and the tendency of the measuring strip to resist bending and, with such an arrangement, the return of the measuring strip into its casing into coiled form is accomplished by pushing in on the strip. When this is done, the balance normally established is overcome so that the resilient member assumes a more closely coiled condition and takes up the slack. In this type of measuring device, the use or need of means for checking the inward movement of the measuring strip would depend upon the degree of tension provided in the coiled spring.

In any event, it has been the universal practice in measuring devices of this sort to permanently connect one end of the measuring strip to the resilient means in order to insure against the loss of the proper relationship between the measuring portion and its resilient winding means, it being evident that, if the measuring strip were disconnected and the spring permitted to unwind owing to the energy which has been stored up therein, the free end of the spring would be drawn into the casing, requiring dis-assembly of the parts in order to again make the connection. In re-assembling the parts, considerable skill would be required in rewinding the spring so it has the desired predetermined tension. Even where the measuring device has the usual regulating means, such as a pawl and ratchet device or frictional brake device, there is a possibility of the resilient spring discharging its stored energy after the measuring strip has been disconnected, due to failure of regulating means such as may occur if the device were dropped onto the floor.

Now it is of distinct disadvantage to have the measuring strip permanently connected to the winding means because of the inconvenience, and sometimes inability, to utilize either end of the measuring scale as a starting point when it is desired to take measurements. It is usually necessary in taking measurements on such scales to begin at the unattached end which is opposite to the container or winding device. In many instances, it is necessary in taking measurements, to turn the entire device end for end, an operation which is very inconvenient. These statements particularly apply to measuring devices having rules consisting of a metallic strip having a convex cross section and which is sufficiently flexible to permit of its being coiled but of sufficient stiffness and resiliency to cause it to remain in substantially straight or unrolled condition when not coiled. In such instances, it may be desired to hold the rule at one end and leave the other end suspended or to move the strip longitudinally from one position to another when taking a succession of measurements between spaced points.

The aim of the present invention is to provide an improved measuring device of the character described wherein the above and other objects and disadvantages incident to structures heretofore made are obviated or overcome. To these ends, I provide means whereby the measuring strip may be quickly and easily detached from the winding device, and accidental discharge of the stored energy of the tensioning means is positively guarded against after the strip is detached. Due to the fact that the measuring strip is detachable, it is more convenient in use, particularly in that measurements can be easily taken by starting from either end of the measuring strip; the strip may be more conveniently and readily handled as it is not weighted at one end by the casing; and, when taking a measurement between distant points, the strip may be successively moved between those points. It is also possible to employ to the best advantage a double graduated strip, one scale starting from one end of the strip and the other scale from the other end, the two scales reading, of course, in opposite directions.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawing, wherein is shown, for illustrative purposes, one of the many embodiments which the present invention may take:

Figure 1 is a side view of the measuring device, the measuring strip being shown as having been completely withdrawn from the casing or holder;

Fig. 2 is a top plan view of what is shown in Fig. 1; and

Fig. 3 is an edge view of the casing, this view being taken through one end of the measuring strip substantially on the line 3—3 of Fig. 1.

Referring to the drawing in detail, 10 designates a casing or holder of any suitable size or configuration, it being shown in the present instance as comprising two generally round or cup-shaped parts suitably connected together and having an entrance opening or slot 11 in its peripheral wall. Within the casing is a suitable winding or tensioning device which may be of either of the types described, that is, the type wherein the coiled spring has, of itself, sufficient tension or power to withdraw the measuring strip completely into the casing, or of the type wherein the coiled spring is set at such a low tension that it does not of itself overcome the resiliency of the measuring strip or the friction of the parts, but assists in taking up the slack when the measuring device is pushed endwise back into the casing. In this embodiment, the former type of tensioning device is illustrated. It is shown as having a conventional drum 12 rotatably mounted in a casing or holder 10, and a coiled spring 13 the inner end of which is anchored and the outer end of which is suitably connected to the drum. Secured to the drum in any suitable manner, so that it will lie upon the exterior thereof, is a strap end 14. Obviously, the device may be provided with suitable manually manipulable means for regulating the spring device, such, for example, as a pawl and ratchet means or a frictional brake means, neither of which is shown as they are old and well-known constructions. The measuring strip is designated generally by the numeral 15 and, while the strip may take any suitable form, it is shown as comprising a metal ribbon curved to have a concavo-convex section. A rule or measuring strip of this kind is disclosed in the Hiram A. Farrand Patent No. 1,402,589 granted January 3rd, 1922 and assigned to the same assignee as is the present application. It may have at one end a hook 16 or it may be provided with a loop or bow. In the present instance, this strip has, on one side face and at opposite edges, scales 17 and 18 which respectively begin from the opposite ends of the strip.

Referring now to the detachable connection between the strap end 14 and the measuring strip, this includes, in the present illustrative disclosure, a transverse pin or hook 20 carried by one of these members and an eye or sleeve 21 carried by the other one and adapted to receive the free end of the hook or pin. In the present instance, the pin is shown as being fixed in a sleeve 22 formed as part of a clip 23 riveted or otherwise secured to the end of the measuring strip. The sleeve 21 is part of a clip 24 secured to the free end of the strap end, as by means of rivets 25. The sleeve 22 extends but part way across the strip from one side edge thereof, and the sleeve 21 extends but part way across the strap end from the other edge thereof so that these sleeves may be brought end to end and their over-all length is no greater than the width of the strap end or strip.

For the purpose of securing the resilient means against loss or discharge of its stored energy after the measuring strip has been disconnected, there is provided, on the end of the strap end, suitable anchoring means which is here shown as being in the form of two spring leaves or fingers 30 and 31, respectively, disposed on opposite sides of the strap end. In the present illustrative disclosure, these fingers constitute extensions of the plies of the clip 24 but, obviously, they may be separate from that clip. The free ends of these fingers normally spring away from each other to a position where the distance between those free ends is greater than the width of the slot or hole 11 in the casing.

With this arrangement, it will be observed that when it is desired to disconnect the measuring strip from the winding or tensioning device, the strip is pulled out to its full length so as to expose the detachable connection and withdraw the anchoring means from the inside of the casing. The strip may then be detached by merely moving it sidewise to thereby withdraw the free end of the pin from the sleeve 21. As the clip 24 is drawn outwardly through the slot, the spring fingers will be flexed inwardly by their engagement with the edges of the slot, and when the strip has been fully withdrawn to the position shown in Fig. 1, these fingers spring apart. Now, should the tension device tend to unwind, the fingers will engage the external peripheral face of the casing above and below the slot, respectively, and thus loss or discharge of the stored energy of the winding device is guarded against. The measuring strip, having been disconnected, can be very conveniently used, and it is feasible to employ to the best advantage either of the scales with which the strip is provided. The strip may be connected to the strap end by merely positioning the free end of the pin 20 in the sleeve 21. When it is desired to wind up the attached strip, the spring anchoring fingers are manually pressed towards each other to the dotted line positions shown in Fig. 1 and held in that position while they enter the slot 11, whereupon they may be released.

It will be observed, from the foregoing description taken in connection with the accompanying drawing, that, with my improved arrangement, the winding device or tensioning means cannot accidentally unwind and draw the strap end into the casing after the measuring strip has been drawn out to its full length. The measuring strip may then be safely disconnected from the tensioning device without danger of losing or discharging the stored energy of the tensioning device. The measuring strip may be very conveniently disconnected and connected to the tensioning device and, when disconnected, it can be used to the best advantage.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a holder member, a measuring strip adapted to be coiled therein and having the requisite stiffness to withstand a longitudinally compressive thrust, resilient means within the holder for coiling said strip and having a strap end member to which said strip is connected in a quick detachable manner, means for connecting said strap end member to said strip in a quick detachable manner, said connecting means being so formed and arranged as to resist detachment when a longitudinal compressive thrust is conveyed thereto upon pushing said measure into coiled form, and separate means secured to the strap which is engageable with the outside of the holder for preventing the resilient means from uncoiling while the measuring strip is detached, said separate means automatically engaging the outside of the holder upon complete withdrawal of the strip from the holder and before it is detached from the strap.

2. In combination, a holder having an entrance slot, a measuring strip adapted to be coiled within said holder and comprising a strip of non-planar cross section and having requisite stiffness to withstand a longitudinal compressive thrust, a resilient means within said holder for coiling said strip and having a strap end, a quick detachable connection between said strip and strap end and comprising separable elements respectively secured thereto, and a flexible spring finger fastened at one end to said strap end and arranged to normally assume a longitudinally curved contour and adapted to be drawn outwardly through said slot when the strip is entirely withdrawn from said holder, said finger, when out of said holder, normally springing away from the strap and overlying the edge of said slot so as to lock thereagainst and secure the resilient means against loss of its stored energy, said finger being effective independently of said detachable connection.

3. In combination, a holder member having an entrance slot, a measuring strip member adapted to be coiled within said holder and comprising a strip of non-planar cross section and having requisite stiffness to withstand a longitudinal compressive thrust, and a resilient means within said holder for coiling said strip member and having a strap end member, one of said members having an eye and the other of said members having a pin adapted to be detachably received by said eye, said strap end member having a pair of resilient flexible fingers effective independently of said eye and pin and disposed at opposite sides thereof, the free ends of said fingers being directed towards said holder irrespective of the relative positions of said eye and pin, when beyond said holder and the distance between the free ends of said fingers being greater than the width of said slot.

4. A measuring device comprising a casing, a resilient coilable strip receivable therein having a non-planar cross section and arranged to normally assume a linear form with any uncoiled portion thereof, a coilable mechanism within the casing including a spring having a flexible strap member secured thereto, means including a laterally connectable pin detachably securing the measuring strip to the strap, and a plurality of resilient deformable members secured to the strap and coilable therewith, said deformable members being arranged to project outwardly from the strap and engage the casing when the measuring strip is detached therefrom.

5. A measuring device comprising a holder having an entrance slot therethrough, a flexible measuring strip adapted to pass through said slot and be coiled within the holder, resilient means within the holder for coiling said strip and having a flexible strap end, a quick detachable connection between the strip and strap end, and a spring finger secured to said strap and engageable with the holder independent of the operation of the detachable connection, said spring being adapted to be drawn outwardly through said slot when the measuring strip is entirely withdrawn from the holder and to automatically interlock against the holder to secure the resilient means from loss of its stored coilable energy.

6. In combination, a holder, a flexible measuring member adapted to be coiled therein and comprising a strip of non-planar cross section and having sufficient stiffness to withstand a longitudinal compressive thrust, a resilient coilable member for storing energy and adapted to coil said measuring member within the holder, means for connecting said measuring member to said resilient member in a readily detachable manner and including a sleeve portion on the end of one of said members and a laterally extending pin on the other of said members which is adapted to be engaged within said sleeve portion without deforming the latter, and resilient means automatically engageable with the holder in response to a complete withdrawal of the measuring member to prevent release of the stored energy of said resilient member irrespective of the relative positions of the pin and sleeve and whenever the measuring member is completely withdrawn from the holder.

JOSEPH OTTOLINI.